US011803086B2

(12) United States Patent
Yeh et al.

(10) Patent No.: US 11,803,086 B2
(45) Date of Patent: Oct. 31, 2023

(54) ELECTRONIC DEVICE AND MANUFACTURING METHOD THEREOF

(71) Applicant: Innolux Corporation, Miao-Li County (TW)

(72) Inventors: Chen-Lin Yeh, Miao-Li County (TW); Chung-Kuang Wei, Miao-Li County (TW); Jen-Hai Chi, Miao-Li County (TW); Yan-Zheng Wu, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 17/535,587

(22) Filed: Nov. 25, 2021

(65) Prior Publication Data

US 2022/0197076 A1   Jun. 23, 2022

Related U.S. Application Data

(60) Provisional application No. 63/129,483, filed on Dec. 22, 2020.

(30) Foreign Application Priority Data

Nov. 4, 2021   (CN) .......................... 202111302513.4

(51) Int. Cl.
  *G02F 1/1345*  (2006.01)
  *G02F 1/1337*  (2006.01)
  *G02F 1/1339*  (2006.01)

(52) U.S. Cl.
  CPC ........ *G02F 1/13458* (2013.01); *G02F 1/1337* (2013.01); *G02F 1/1339* (2013.01)

(58) Field of Classification Search
  CPC .................................................. G02F 1/13458
  See application file for complete search history.

(56) References Cited

U.S. PATENT DOCUMENTS

| 2009/0213314 | A1  | 8/2009  | Azuma et al. |
| 2012/0264345 | A1* | 10/2012 | Yoon ..................... G02F 1/1303 445/25 |
| 2019/0123125 | A1  | 4/2019  | Seki |
| 2019/0304921 | A1* | 10/2019 | Kuroe .................. G02F 1/1333 |
| 2020/0379284 | A1* | 12/2020 | Lu ........................... G02F 1/139 |
| 2022/0050318 | A1* | 2/2022  | Lin ..................... G02F 1/13398 |

FOREIGN PATENT DOCUMENTS

| CN | 107453013 | 12/2017 |
| EP | 3419111   | 12/2018 |
| TW | 201905562 | 2/2019  |

OTHER PUBLICATIONS

"Search Report of Europe Counterpart Application", dated May 19, 2022, p. 1-p. 7.
"Office Action of Taiwan Counterpart Application", dated Aug. 26, 2022, p. 1-p. 4.

* cited by examiner

*Primary Examiner* — Edmond C Lau
(74) *Attorney, Agent, or Firm* — JCIPRNET

(57) ABSTRACT

An electronic device and a manufacturing method thereof are provided. The manufacturing method of the electronic device includes: providing a substrate; providing an adjustable element, including a liquid crystal layer; and bonding the adjustable element onto the substrate.

10 Claims, 7 Drawing Sheets

ELECTRONIC DEVICE AND MANUFACTURING METHOD THEREOF

CROSS-REFERENCE TO RELATED APPLICATION

This application claims the priority benefit of U.S. Provisional Application No. 63/129,483, filed on Dec. 22, 2020 and China Application No. 202111302513.4, filed on Nov. 4, 2021. The entirety of each of the above-mentioned patent applications is hereby incorporated by reference herein and made a part of this specification.

BACKGROUND

Technical Field

The disclosure relates to an electronic device and a manufacturing method thereof.

Description of Related Art

Adjustable elements (such as capacitors, inductors, and microelectromechanical systems (MEMS)) have been used in various types of electronic devices. There is still room for improvement in the performance of traditional adjustable elements. Therefore, an adjustable element with improved performance and a manufacturing method thereof are required.

SUMMARY

According to an embodiment of the disclosure, a manufacturing method of an electronic device includes the following steps. A substrate is provided. An adjustable element is provided. The adjustable element includes a liquid crystal layer. The adjustable element is bonded onto the substrate.

According to an embodiment of the disclosure, the electronic device includes a substrate and an adjustable element. The adjustable element is bonded onto the substrate and includes a liquid crystal layer.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
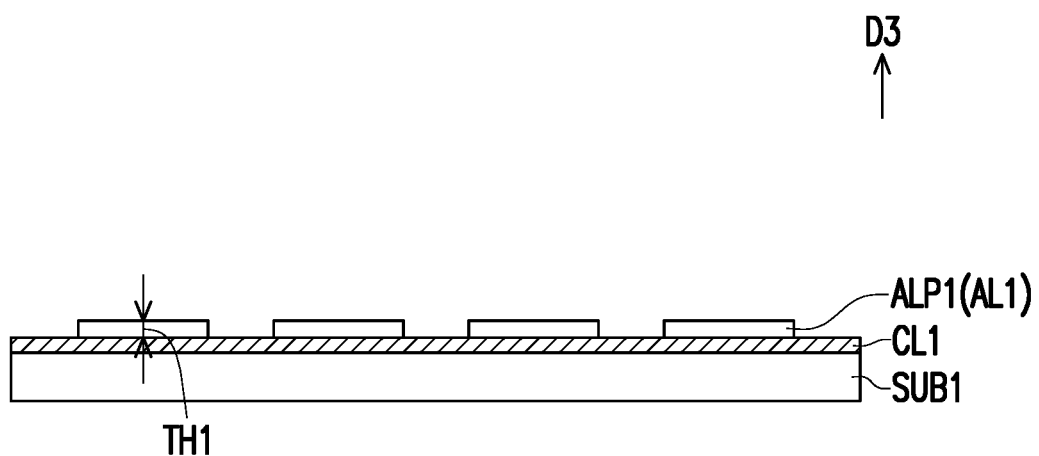
FIG. 1 to FIG. 4 are partial cross-sectional schematic views of a manufacturing process of an adjustable element according to an embodiment of the disclosure.

Throughout the specification and the appended claims of the disclosure, certain words are used to refer to specific components. Persons skilled in the art should understand that electronic device manufacturers may refer to the same components by different names. The disclosure does not intend to distinguish the components with the same function but different names. In the following specification and claims, words such as "comprising" and "including" are open-ended words, which should be interpreted as "comprising but not limited to . . . ".

Directional terms such as "upper", "lower", "front", "rear", "left", and "right" mentioned in the disclosure are only directions with reference to the drawings. Therefore, the used directional terms are used to illustrate, but not to limit, the disclosure. In the drawings, each drawing depicts general features of methods, structures, and/or materials used in specific embodiments. However, the drawings should not be construed as defining or limiting the scope or nature covered by the embodiments. For example, for the sake of clarity, the relative size, thickness, and position of each film layer, region, and/or structure may be reduced or enlarged.

A structure (or layer, component, substrate) being located on/above another structure (or layer, component, substrate) described in the disclosure may mean that the two structures are adjacent and directly connected or may mean that the two structures are adjacent but not directly connected. Indirect connection means that there is at least one intermediate structure (or intermediate layer, intermediate component, intermediate substrate, intermediate interval) between the two structures, a lower surface of one structure is adjacent to or directly connected to an upper surface of the intermediate structure, and an upper surface of the other structure is adjacent to or directly connected to a lower surface of the intermediate structure. The intermediate structure may be composed of a single-layer or multi-layer physical structure or a non-physical structure, but not limited thereto. In the disclosure, when a certain structure is disposed "on" another structure, it may mean that the certain structure is "directly" on the another structure or may mean that the certain structure is "indirectly" on the another structure, that is, there is at least one structure sandwiched between the certain structure and the another structure.

The terms "approximately", "equal to", "equivalent", "same", "substantially", or "roughly" are usually interpreted as falling within 20% of a given value range, or interpreted as falling within 10%, 5%, 3%, 2%, 1%, or 0.5% of a given value or range.

Ordinal numbers such as "first" and "second" used in the specification and the claims are used to modify elements and do not imply and represent that the element(s) has any ordinal number, and also do not represent the sequence of a certain element and another element or the sequence of a manufacturing method. The use of the ordinal numbers is only used to clearly distinguish an element with a certain name from another element with the same name. The same terms may not be used in the claims and the specification. Accordingly, a first component in the specification may be a second component in the claims.

Electrical connection or coupling described in the disclosure may refer to direct connection or indirect connection. In the case of direct connection, terminals of components on two circuits are directly connected or connected to each other by a conductor line segment. In the case of indirect connection, there is a switch, a diode, a capacitor, an inductor, a resistor, other suitable components, or a combination of the above components between the terminals of the components on the two circuits, but not limited thereto.

In the disclosure, a thickness, a length, and a width may be measured by adopting an optical microscope, and the thickness or the width may be measured by a cross-sectional image in an electron microscope, but not limited thereto. In addition, there may be a specific error in any two values or directions used for comparison. In addition, the terms "equal to", "equivalent", "same", "substantially", or "roughly" mentioned in the disclosure generally represent falling within a 10% range of a given value or range. In addition, the terms "the given range is a first value to a second value" and "the given range falls within a range of the first value to the second value" mean that the given range includes the first value, the second value, and other values in between. If a first direction is perpendicular to a second direction, an angle between the first direction and the second direction may be between 80 degrees and 100 degrees. If the first direction is parallel to the second direction, the angle between the first direction and the second direction may be between 0 degrees and 10 degrees.

It should be noted that without departing from the spirit of the disclosure, features in several different embodiments may be replaced, reorganized, and mixed to complete other embodiments in the following embodiments. The features between the embodiments may be arbitrarily mixed and matched as long as there is no violation to the spirit of the invention or conflict therebetween.

Unless otherwise defined, all terms (including technical and scientific terms) used herein have the same meaning as commonly understood by persons skilled in the art of the disclosure. It can be understood that the terms such as terms defined in commonly used dictionaries should be interpreted as having meanings consistent with the meanings in the related art and the background or the context of the disclosure, and should not be interpreted as having idealized or overly formal meanings unless explicitly defined in the embodiments of the disclosure.

In the disclosure, an electronic device may include a display device, a backlight device, an antenna device, a sensing device, or a splicing device, but not limited thereto. The electronic device may be a bendable or flexible electronic device. The display device may be a non-self-luminous display device or a self-luminous display device. The antenna device may be a liquid crystal antenna device or a non-liquid crystal antenna device, and the sensing device may be a sensing device that senses capacitance, light, heat, or ultrasound, but not limited thereto. In the disclosure, an electronic element may include a passive element and an active element, such as a capacitor, a resistor, an inductor, a diode, and a transistor. The diode may include a light emitting diode or a photodiode. The light emitting diode (LED) may include, for example, an organic LED (OLED), a mini LED, a micro LED, or a quantum dot LED, but not limited thereto. Hereinafter, the content of the disclosure will be illustrated below with the display device as the electronic device or the splicing device, but the disclosure is not limited thereto. In the disclosure, an adjustable element may be, for example, a capacitor, an inductor, a microelectromechanical system (MEMS), or other adjustable elements, but not limited thereto.

It should be noted that technical solutions provided by different embodiments below may be interchanged, combined, or mixed to form another embodiment without violating the spirit of the disclosure.

In some embodiments of the disclosure, unless specifically defined, terms related to bonding and connection, such as "connection" and "interconnection", may mean that two structures are in direct contact or may also mean that two structures are not in direct contact, wherein there is another structure disposed between the two structures. The terms related to bonding and connection may also include the case where the two structures are both movable or the two structures are both fixed. In addition, the terms "electrical connection" and "coupling" include any direct and indirect electrical connection means.

In the embodiments below, the same or similar elements will adopt the same or similar reference numerals, and redundant descriptions thereof are omitted. In addition, features in different embodiments may be arbitrarily mixed and matched as long as there is no violation to the spirit of the invention or conflict therebetween, and simple equivalent changes and modifications made in accordance with the specification or the claims are all still within the scope of the disclosure. In addition, terms such as "first" and "second" mentioned in the specification or the claims are only used to name different elements or to distinguish different embodiments or ranges, and are not used to limit the upper limit or the lower limit of the number of elements or to limit the manufacturing sequence or configuration sequence of the elements.

FIG. 1 to FIG. 4 are partial cross-sectional schematic views of a manufacturing process of an adjustable element according to an embodiment of the disclosure. Please refer to FIG. 1. A manufacturing method of an adjustable element may include providing a first substrate SUB1. The first substrate SUB1 may include a rigid substrate, a bendable substrate or a flexible substrate. In some embodiments, the first substrate SUB1 may include a photoresist material, an organic or inorganic material, or a combination of the above, but not limited thereto. For example, the first substrate SUB1 may include glass, ceramic, quartz, sapphire, or a combination of the above materials, but not limited thereto. In some embodiments, the material of the first substrate SUB1 may include polyethylene terephthalate (PET), polyimide, liquid crystal polymer (LCP), cyclo olefin polymer (COP), epoxy resin, ajinomoto build-up film (ABF), bismaleimide, fluororesin, and/or other suitable materials, or a combination of the above, but not limited thereto.

In some embodiments, the manufacturing method of the adjustable element may include disposing a first conductive layer CL1 and/or a first alignment layer AL1 on the first substrate SUB1. The first conductive layer CL1 may be disposed on the first substrate SUB1 and located between the first substrate SUB1 and the first alignment layer AL1. In other embodiments (not shown), another dielectric layer may be selectively disposed between the first conductive layer CL1 and the first substrate SUB1. The dielectric layer may reduce the chance of peeling between the first substrate SUB1 and the first conductive layer CL1. In some embodiments, the first conductive layer CL1 may be a full-surface conductive layer or patterned conductive layer. In some embodiments, the first conductive layer CL1 may include a transparent conductive layer, a non-transparent conductive layer, or a combination of the above. The material of the transparent conductive layer may include metal oxide, metal mesh, or graphene, but not limited thereto. The metal oxide may include indium tin oxide (ITO), indium zinc oxide (IZO), indium gallium zinc oxide (IGZO), aluminum zinc oxide (AZO), other suitable materials, or a combination of the above, but not limited thereto. The material of the non-transparent conductive layer may include metal or alloy, but not limited thereto. The metal may include copper, aluminum, silver, gold, titanium, molybdenum, any material with high conductivity, or a combination of the above, but not limited thereto.

In some embodiments, the first alignment layer AL1 may be a patterned alignment layer and may include multiple first alignment patterns ALP1. The first alignment patterns ALP1 may be, for example, arranged at intervals, but not limited thereto. In some embodiments, the first alignment patterns ALP1 may be arranged in an array or other manners, but not limited thereto.

Figure 2:
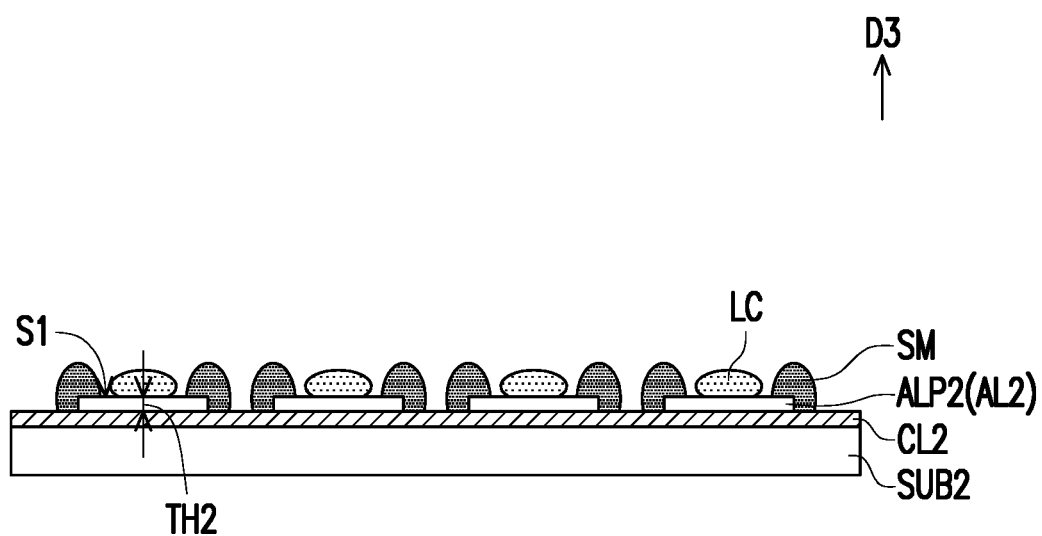

Please refer to FIG. 2, the manufacturing method of the adjustable element may further include providing a second substrate SUB2. The material of the second substrate SUB2 may be the same as or different from the material of the first substrate SUB1, so the description will not be repeated.

In some embodiments, the manufacturing method of the adjustable element may further include disposing a second conductive layer CL2 and a second alignment layer AL2 on the second substrate SUB2, but not limited thereto. The second conductive layer CL2 may be disposed on the second substrate SUB2 and located between the second substrate SUB2 and the second alignment layer AL2. In other embodiments (not shown), another dielectric layer may be selectively disposed between the second conductive layer CL2 and the second substrate SUB2. The dielectric layer may reduce the chance of peeling between the second substrate SUB2 and the second conductive layer CL2. In some embodiments, the second conductive layer CL2 may be a full-surface conductive layer or patterned conductive layer. The second conductive layer CL2 may be a transparent conductive layer or a non-transparent conductive layer. The materials of the transparent conductive layer and the non-transparent conductive layer may be referred to the above and will not be repeated here.

As shown in FIG. 2, in some embodiments, the second alignment layer AL2 may be a patterned alignment layer and may include multiple second alignment patterns ALP2. In some embodiments, the manufacturing method of the adjustable element may include providing a liquid crystal layer LC. In some embodiments, the liquid crystal layer LC may be first disposed on the second alignment layer AL2, but not limited thereto. In other embodiments (not shown), the liquid crystal layer LC may be first disposed on the first alignment layer AU (refer to FIG. 1).

The type of the liquid crystal layer LC is not limited. For example, the liquid crystal layer LC may include nematic liquid crystal, smectic liquid crystal, cholesteric liquid crystal, etc., but not limited thereto. In other embodiments (not shown), the liquid crystal layer LC may be replaced with other materials with adjustable dielectric values, such as carbon nanotubes or other columnar anisotropic materials, according to requirements, but not limited thereto. In some embodiments, the liquid crystal layer LC may be formed on the alignment layer (such as the second alignment layer AL2 or the first alignment layer AL1) through one drop filling (ODF).

In some embodiments, before disposing the liquid crystal layer LC, a sealing member SM may be disposed on the edge of the second alignment pattern ALP2. The sealing member SM may selectively contact or not contact a portion of the second alignment layer AL2. For example, the sealing member SM may be selectively disposed on a portion of a surface 51 of the second alignment layer AL2. The surface 51 may be the surface of the second alignment layer AL2 away from the second substrate SUB2. In other words, the sealing member SM may cover the edge of the second alignment pattern ALP2 and extend to a portion of the surface 51 of the second alignment layer AL2, but not limited thereto. In some embodiments, the sealing member SM may roughly frame a configuration region of the liquid crystal layer LC. From the top view, the contour of the sealing member SM may include a ring shape, such as a circular ring shape, a rectangular ring shape, a polygonal ring shape, or other suitable shapes, but not limited thereto. In some embodiments, the material of the sealing member SM may include a material with low water vapor permeability, such as a photosensitive sealant (such as an ultraviolet curable adhesive), an organic material, or other suitable materials, but not limited thereto. In some embodiments, the surface of the sealing member SM may have an arc contour.

Figure 3:
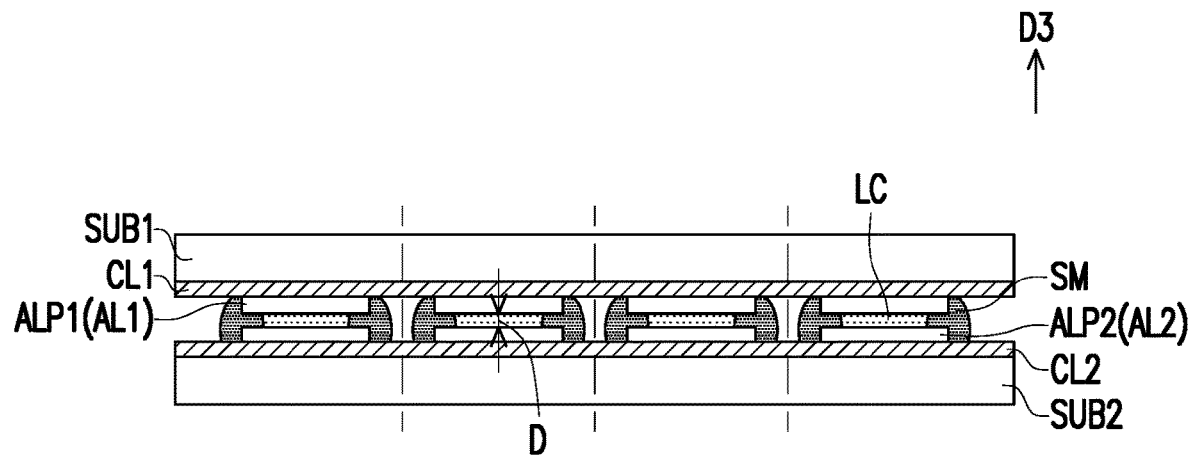

Please refer to FIG. 3. The manufacturing method of the adjustable element may include sealing the liquid crystal layer LC between the first substrate SUB1 and the second substrate SUB2, and the liquid crystal layer LC is disposed between the first substrate SUB1 and the second substrate SUB2. For example, the first substrate SUB1 provided with the first conductive layer CL1 and/or the first alignment layer AL1 may be placed upside down on the second substrate SUB2, so that the first conductive layer CL1 may be disposed between the first substrate SUB1 and the liquid crystal layer LC, the first alignment layer AU may be disposed between the first conductive layer CL1 and the liquid crystal layer LC, the second conductive layer CL2 may be disposed between the second substrate SUB2 and the liquid crystal layer LC, and the second alignment layer AL2 may be disposed between the second conductive layer CL2 and the liquid crystal layer LC. In some embodiments, the second alignment patterns ALP2 may be respectively correspond to the first alignment patterns ALP1. In some embodiments, in a normal direction (refer to a direction D3 in the drawing) of the first substrate SUB1, the second alignment pattern ALP2 may overlap with the first alignment pattern ALP1. In some embodiments, viewed from the normal direction of the first substrate SUB1, a projection area of the second alignment pattern ALP2 to the first substrate SUB1 may be the same as or different from a projection area of the first alignment pattern ALP1 to the first substrate SUB1. Through the above process, the liquid crystal layer LC may be disposed between the corresponding first alignment pattern ALP1, the corresponding second alignment pattern ALP2, and the sealing member SM, but not limited thereto. In some embodiments, in the normal direction of the first substrate SUB1, a thickness D of the liquid crystal layer LC may be 1 μm to 20 μm, that is, 1 μm≤D≤20 μm, but not limited thereto. In some embodiments, the thickness D of the liquid crystal layer LC may be 3 μm to 18 μm, that is, 3 μm≤D≤18 μm. In some embodiments, the thickness D of the liquid crystal layer LC may be 5 μm to 15 μm, that is, 5 μm≤D≤15 μm. The thickness D of the liquid crystal layer LC may be adjusted according to requirements. For example, the thickness D of the liquid crystal layer LC may be adjusted according to the dielectric constant of the liquid crystal layer LC or other parameters, but not limited thereto.

In some embodiments, the manufacturing method of the adjustable element may further include a singulation process. For example, the assembled first substrate SUB1 and second substrate SUB2 may be cut along dotted lines shown in FIG. 3.

Figure 4:
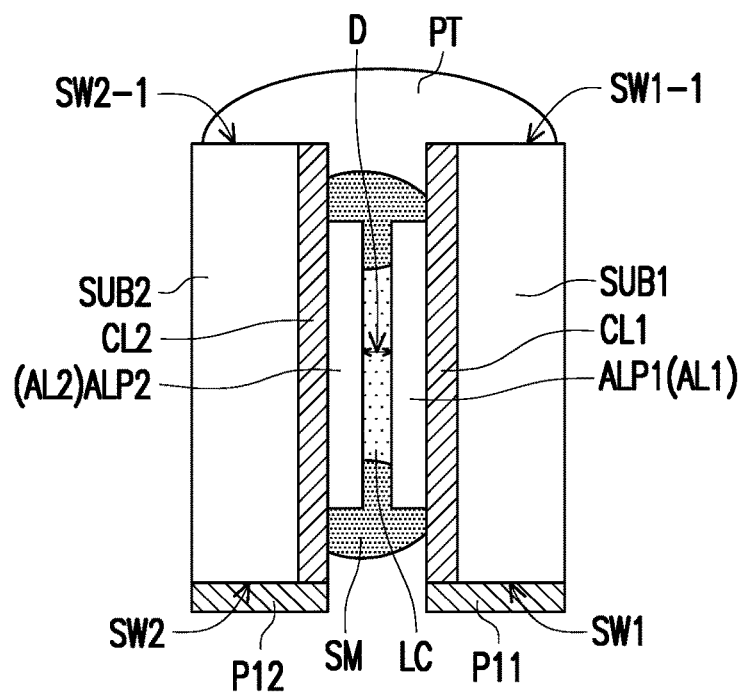

Please refer to FIG. 4. The manufacturing method of the adjustable element may include forming a first pad on a sidewall of at least one of the first substrate SUB1 and the second substrate SUB2. For example, a first pad P11 is formed on a sidewall SW1 of the first substrate SUB1, or a first pad P12 is formed on a sidewall SW2 of the second substrate SUB2, but not limited thereto. The material of the first pad P11 and/or the first pad P12 may include a transparent conductive material, a non-transparent conductive material (such as metal or alloy), or a combination of the above. In some embodiments, the material of the first pad P11 and/or the first pad P12 may include nickel-gold, nickel-palladium-gold, silver, gold, nickel, tin, organic solderability preservative (OSP), other conductive materials, or a combination of the above, but not limited thereto.

Please refer to FIG. 4. In some embodiments, the manufacturing method of the adjustable element may include disposing a protective layer PT on another sidewall of at least one of the first substrate SUB1 and/or the second substrate SUB2. For example, the protective layer PT may be disposed on a sidewall SW1-1 of the first substrate SUB1 and/or a sidewall SW2-2 of the second substrate SUB2, but not limited thereto. In some embodiments, the protective layer PT may contact a portion of the first conductive layer CL1, the second conductive layer CL2 and/or the sealing member SM, but not limited thereto. The protective layer PT may be used to reduce the chance of damage to an adjustable element 10 or reduce the intrusion of water and oxygen, which affects the liquid crystal layer LC or any conductive layer in the adjustable element 10.

In some embodiments, the material of the protective layer PT may include silicon nitride (SiNx), silicon oxide (SiOx), silicon oxynitride (SiOxNy), epoxy resin, acrylic, solder resist, bismaleimide, polyimide, other suitable materials, or a combination of the above, but not limited thereto. In some embodiments, the protective layer PT may have an arc contour. After disposing the protective layer PT and/or the first pad (such as the first pad P11 and/or the first pad P12), the manufacture of the adjustable element 10 is completed. In other embodiments (not shown), the adjustable element 10 may selectively not include the protective layer PT. In some embodiments, the adjustable element 10 may be used as a variable capacitor or other suitable electronic elements. In detail, the dielectric change of the liquid crystal layer LC (or other dielectric materials disposed between the two conductive layers) is controlled through changing the potential difference between the first conductive layer CL1 and the second conductive layer CL2 of the adjustable element 10 to achieve the effect of a variable capacitor, but not limited thereto.

Figure 5:
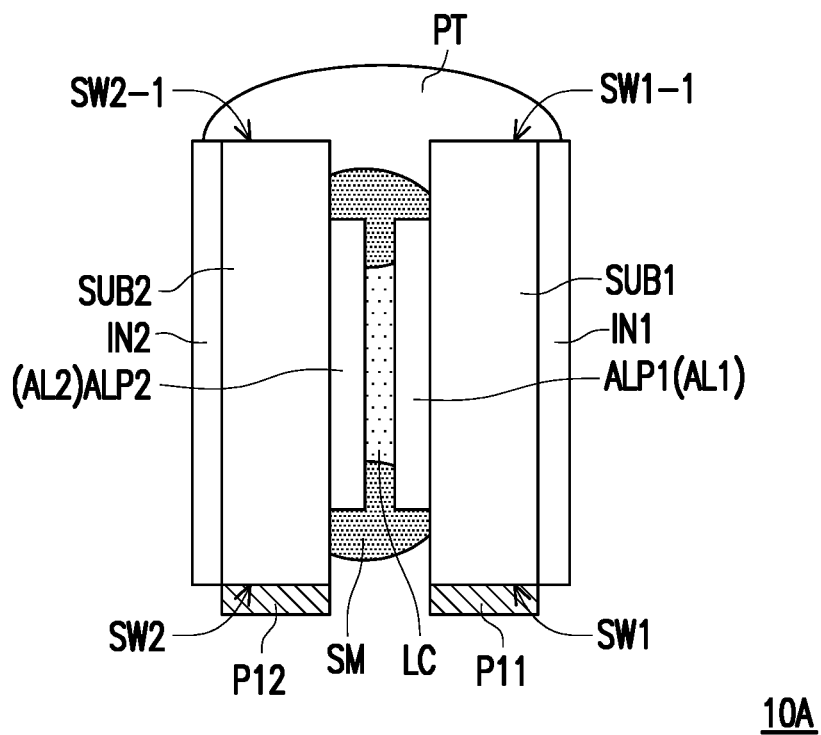
FIG. 5 and FIG. 6 are respectively cross-sectional schematic views of adjustable elements according to some embodiments of the disclosure.
Figure 6:
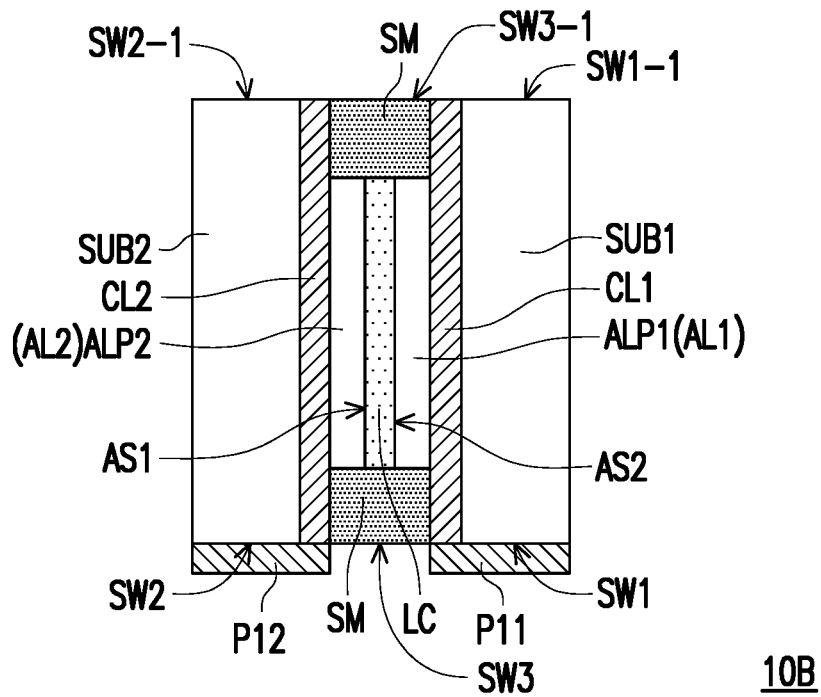

FIG. 5 and FIG. 6 are respectively cross-sectional schematic views of adjustable elements according to some embodiments of the disclosure. Please refer to FIG. 5. The main difference between an adjustable element 10A and the adjustable element 10 of FIG. 4 may include the following. In the adjustable element 10A, the first substrate SUB1 and/or the second substrate SUB2 include a conductive material. For example, the first substrate SUB1 and/or the second substrate SUB2 may include a metal substrate or an alloy substrate, but not limited thereto. In this way, the adjustable element 10A may selectively not include the first conductive layer CL1 and/or the second conductive layer CL2. In some embodiments, the first pad P11 may be selectively disposed on the sidewall SW1 of the first substrate SUB1, or the first pad P12 may be selectively disposed on the sidewall SW2 of the second substrate SUB2, but not limited thereto. In some embodiments, the adjustable element 10A may selectively include an insulating layer, such as an insulating layer IN1 and/or an insulating layer IN2. In some embodiments, the insulating layer IN1 may be disposed on the side of the first substrate SUB1 away from the second substrate SUB2. In some embodiments, the insulating layer IN1 and the first alignment layer AL1 may be respectively located on opposite sides of the first substrate SUB1. In some embodiments, the insulating layer IN2 may be disposed on the side of the second substrate SUB2 away from the first substrate SUB1. In some embodiments, the insulating layer IN2 and the second alignment layer AL2 may be respectively located on opposite sides of the second substrate SUB2. In some embodiments, the insulating layer IN1 and/or the insulating layer IN2 may be respectively used to protect the first substrate SUB1 and/or the second substrate SUB2, or reduce the chance of short circuit caused by other conductive materials contacting the first substrate SUB1 or the second substrate SUB2. For example, the material of the insulating layer IN1 and/or the insulating layer IN2 may include epoxy, acrylic-based resin, silicone, polyimide polymer, or a combination of the above, but not limited thereto. In some embodiments, the protective layer PT may selectively contact a portion of the insulating layer IN1 and/or the insulating layer IN2. In some embodiments, the sealing member SM may not protrude from the first substrate SUB1 or the second substrate SUB2. In some embodiments, a projection area of the sealing member SM to the first substrate SUB1 may be located within the projection area of the second substrate SUB2 to the first substrate SUB1, but not limited thereto.

Please refer to FIG. 6. The main differences between an adjustable element 10B and the adjustable element 10 of FIG. 4 may include the following. In the adjustable element 10B, the sealing member SM may be disposed on the conductive layer (such as the first conductive layer CL1 or the second conductive layer CL2) and not extend to a surface (such as a surface AS1 and a surface AS2) of the alignment layer (such as the first alignment layer AL1 and the second alignment layer AL2) adjacent to the liquid crystal layer LC. In other words, the sealing member SM may be not disposed between the first alignment layer AL1 and the second alignment layer AL2. In some embodiments, the projection area of the sealing member SM to the first substrate SUB1 and the projection area of the first alignment layer AL1 (or the second alignment layer AL2) to the first substrate SUB1 do not overlap, but not limited thereto. In some embodiments, a sidewall SW3 of the sealing member SM away from the liquid crystal layer LC may be roughly flush with the sidewall SW1 of the first substrate SUB1 and/or the sidewall SW2 of the second substrate SUB2, but not limited thereto. In some embodiments, another sidewall SW3-1 of the sealing member SM away from the liquid crystal layer LC may be roughly flush with another sidewall SW1-1 of the first substrate SUB1 and/or another sidewall SW2-1 of the second substrate SUB2, but not limited thereto. In other embodiments (not shown), the sealing member SM may selectively protrude from the first substrate SUB1 and the second substrate SUB2. In other embodiments (not shown), the projection area of the sealing member SM to the first substrate SUB1 may be partially not located within the projection area of the second substrate SUB2 to the first substrate SUB1, but not limited thereto.

In some embodiments, the adjustable element 10B may not include the protective layer PT of FIG. 4. In other embodiments, the adjustable element 10B may include the protective layer PT.

Figure 7:
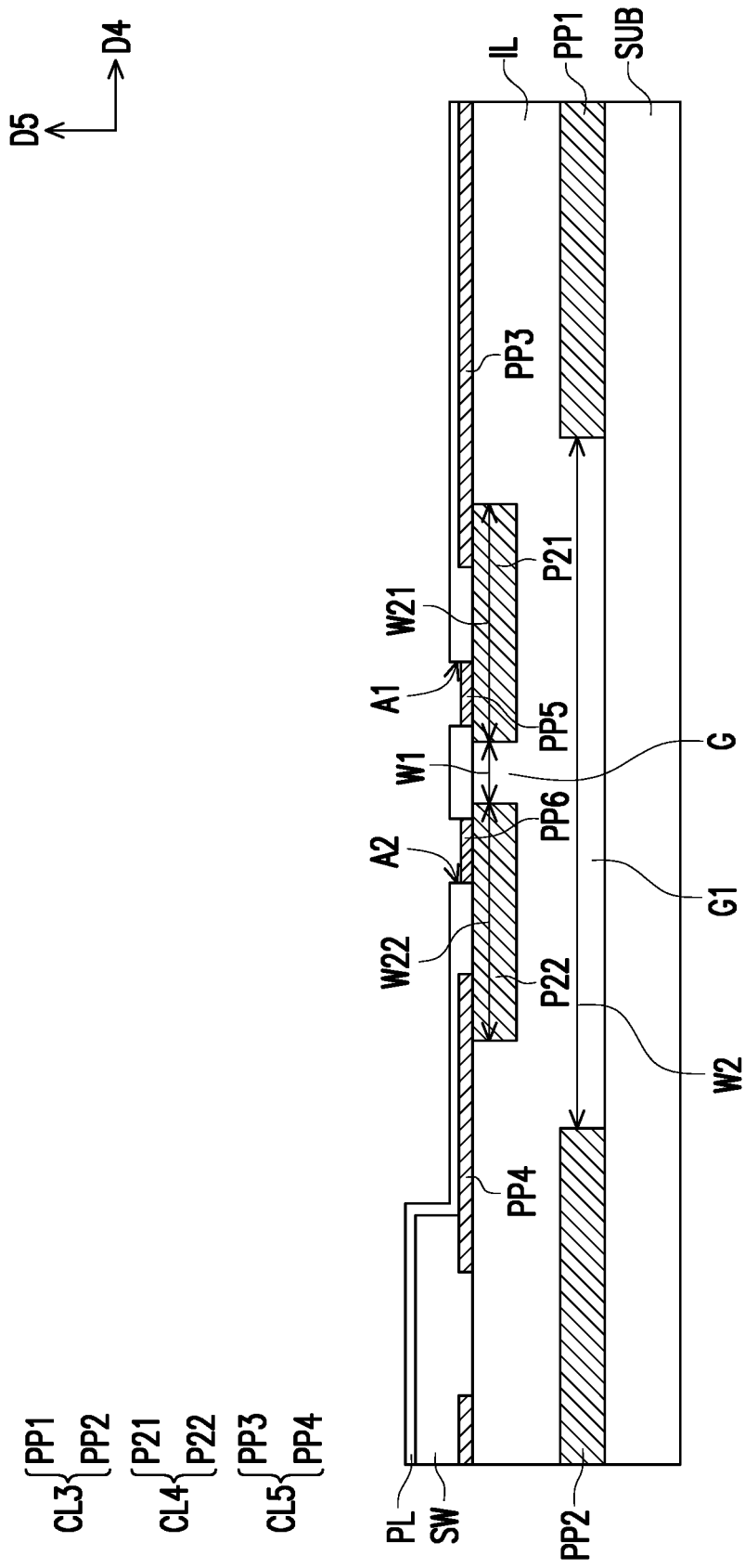
FIG. 7 to FIG. 8 are partial cross-sectional schematic views of a manufacturing process of an electronic device according to an embodiment of the disclosure.
Figure 8:
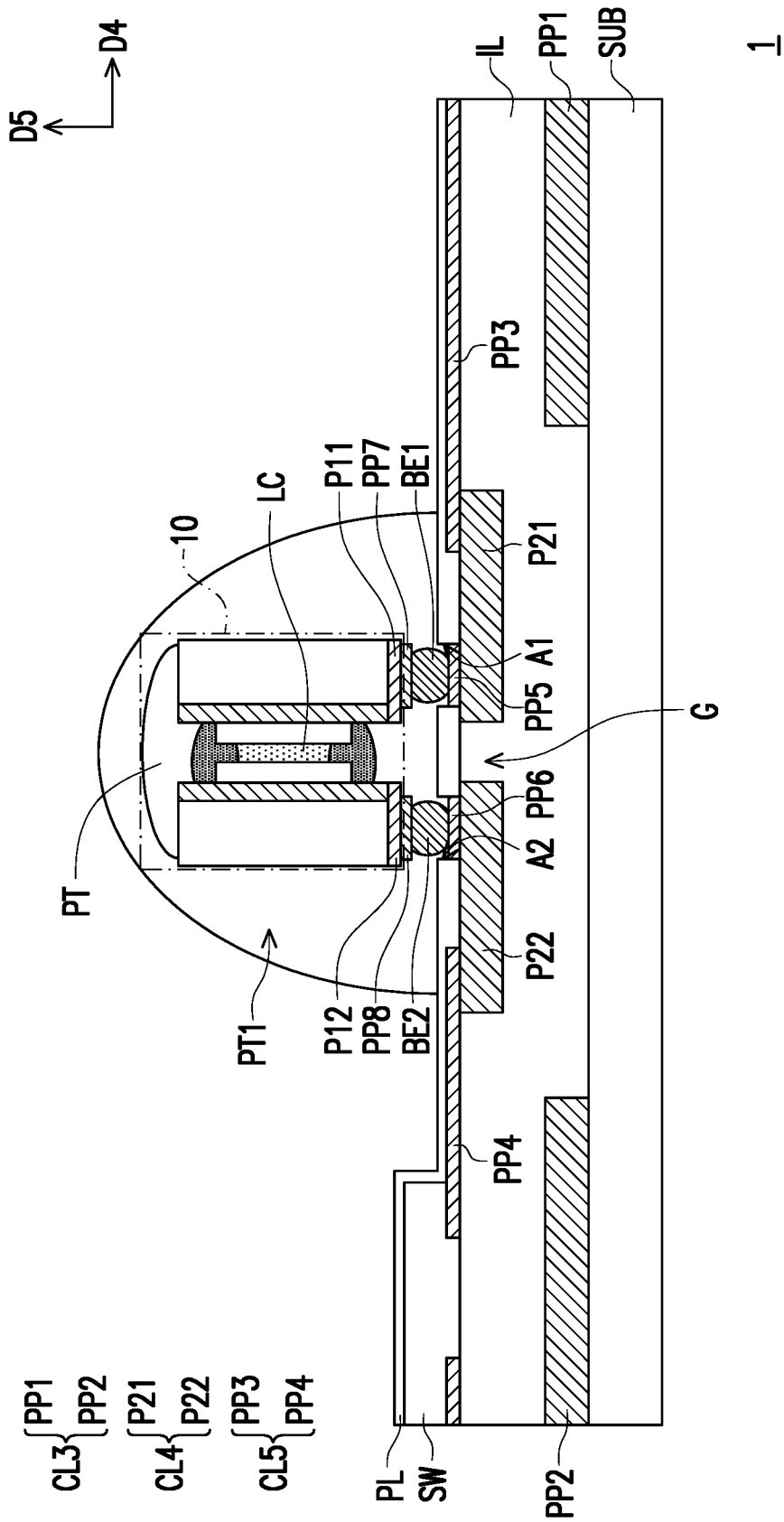

FIG. 7 to FIG. 8 are partial cross-sectional schematic views of a manufacturing process of an electronic device according to an embodiment of the disclosure. Please refer to FIG. 7. A manufacturing method of an electronic device may include providing a substrate SUB. The substrate SUB may include a rigid substrate, a bendable substrate, or a flexible substrate. In some embodiments, the substrate SUB may include a photoresist material, an organic or inorganic material, or a combination of the above, but not limited thereto. For example, the substrate SUB may include glass, ceramic, quartz, sapphire, or a combination of the above materials, but not limited thereto. In some embodiments, the material of the substrate SUB may include polyethylene terephthalate (PET), polyimide, liquid crystal polymer (LCP), cyclo olefin polymer (COP), epoxy resin, ajinomoto build-up film (ABF), bismaleimide, fluororesin, and/or other suitable materials, or a combination of the above, but not limited thereto.

In some embodiments, the manufacturing method of the electronic device may include disposing a conductive layer CL3 on the substrate SUB. The conductive layer CL3 may be a patterned conductive layer and may include a conductive pattern PP1 and/or a conductive pattern PP2, but not limited thereto. The conductive layer CL3 may include a transparent conductive layer or a non-transparent conductive layer. The materials of the transparent conductive layer and the non-transparent conductive layer may be referred to the above and will not be repeated here. In some embodiments, the conductive layer CL3 may contact the substrate SUB, but not limited thereto. In some embodiments, a dielectric layer (not shown) may be disposed between the substrate SUB and the conductive layer CL3, thereby reducing the chance of peeling of the substrate SUB.

In some embodiments, the manufacturing method of the electronic device may include disposing an insulating layer IL on the substrate SUB. The insulating layer IL may be disposed on the conductive layer CL3. The material of the insulating layer IL may include silicon nitride, silicon oxide, silicon oxynitride, epoxy resin, acrylic, solder resist, silicon material, bismaleimide, polyimide, other materials, or a combination of the above, but not limited thereto.

In some embodiments, the manufacturing method of the electronic device may include disposing a conductive layer CL4 and/or a conductive layer CL5 on the insulating layer IL. In some embodiments, the insulating layer IL may be disposed between the conductive layer CL3 and the conductive layer CL4, and the conductive layer CL3 and the conductive layer CL4 are electrically insulated through the insulating layer IL.

In some embodiments, the manufacturing method of the electronic device includes disposing a second pad on the substrate SUB. In detail, the conductive layer CL4 may be disposed on the substrate SUB, the conductive layer CL4 may be a patterned conductive layer, and the patterned conductive layer CL4 may include a second pad P21 and/or a second pad P22, but not limited thereto. The material of the second pad P21 and/or the second pad P22 may include a transparent conductive material, a non-transparent conductive material (such as metal or alloy), or a combination of the above. In some embodiments, the material of the second pad P21 and/or the second pad P22 may include nickel-gold, nickel-palladium-gold, silver, gold, nickel, tin, organic solderability preservative (OSP), other conductive materials, or a combination of the above, but not limited thereto.

In some embodiments, in a direction D4, the second pad P21 may be located between the second pad P22 and the conductive pattern PP1, or the second pad P22 may be located between the second pad P21 and the conductive pattern PP2, but not limited thereto. The direction D4 may be perpendicular to a normal direction D5 of the substrate SUB. In some embodiments, in the direction D4, a width W1 of a gap G between the second pad P21 and the second pad P22 may be less than a width W2 of a gap G1 between the conductive pattern PP1 and the conductive pattern PP2, but not limited thereto. In some embodiments, in the direction D4, a sum of a width W21 of the second pad P21, a width W22 of the second pad P22, and the width W1 may be less than or equal to the width W2, but not limited thereto. In some embodiments, in the normal direction D5 of the substrate SUB, the second pad P21 and/or the second pad P22 do not overlap with the conductive pattern PP1 and/or the conductive pattern PP2, but not limited thereto.

In some embodiments, the conductive layer CL4 may include a transparent conductive layer and/or a non-transparent conductive layer. The materials of the transparent conductive layer and the non-transparent conductive layer may be referred to the above and will not be repeated here.

In some embodiments, the conductive layer CL5 may be disposed on the conductive layer CL4 and the insulating layer IL. In some embodiments, the conductive layer CL5 may be a patterned conductive layer, and the conductive layer CL5 may include a conductive pattern PP3 and/or a conductive pattern PP4, but not limited thereto. In some embodiments, the conductive pattern PP3 may be disposed on a portion of the second pad P21 and is electrically connected to the second pad P21. In some embodiments, the conductive pattern PP4 may be disposed on a portion of the second pad P22 and is electrically connected to the second pad P22. In some embodiments, the conductive layer CL4 and/or the conductive layer CL5 may include a metal layer or a transparent conductive layer.

In some embodiments, the manufacturing method of the electronic device may include disposing a switch element SW on the insulating layer IL, but not limited thereto. In some embodiments, the switch element SW may be manufactured on the insulating layer IL through a yellow light process. In some embodiments, the switch element SW may be bonded onto the insulating layer IL through a bonding process. In some embodiments, the switch element SW may include a thin film transistor (not shown) or other suitable structures. In some embodiments, in the direction D5, the switch element SW may partially overlap with the conductive pattern PP4. In some embodiments, the switch element SW may be electrically connected to the conductive pattern PP4.

In some embodiments, the manufacturing method of the electronic device may include providing a dielectric layer PL. The dielectric layer PL may be formed on the switch element SW and/or the conductive layer CL5. In some embodiments, the dielectric layer PL may have an opening A1 exposing a portion of the second pad P21 and an opening A2 exposing a portion of the second pad P22, but not limited thereto. In some embodiments, the material of the dielectric layer PL may include silicon nitride, silicon oxide, epoxy resin, acrylic, solder resist, silicon material, bismaleimide, polyimide, other suitable materials, or a combination of the above, but not limited thereto.

In some embodiments, the manufacturing method of the electronic device may include disposing a conductive pattern in the opening of the dielectric layer PL. For example, a conductive material PP5 and a conductive material PP6 are respectively disposed in the opening A1 and the opening A2 of the dielectric layer PL. In some embodiments, the conductive material PP5 and/or the conductive material PP6 may be formed through electroless plating, immersion, or electrolysis, etc., but not limited thereto. In some embodiments, the conductive material PP5 and/or the conductive material PP6 may include nickel-gold, nickel-palladiumgold, silver, gold, nickel, tin, organic solderability preservative, other conductive materials, or a combination of the above, but not limited thereto.

In some embodiments, the conductive layer CL3 and the conductive layer CL4 may be connected to an external circuit (not shown) to receive signals. In detail, in some embodiments, when the electronic device is an antenna, the conductive pattern PP1 and/or the conductive pattern PP2 of the conductive layer CL3 may receive a first signal. The first signal may be a radio frequency signal, but not limited thereto. In some embodiments, the second pad P21 of the conductive layer CL4 and the conductive pattern PP3 of the conductive layer CL5 may receive a second signal. The second signal may be a ground potential, but not limited thereto. There may be a potential difference between the first signal and the second signal. In some embodiments, the second pad P22 of the conductive layer CL4 and the conductive pattern PP4 of the conductive layer CL5 may be electrically connected to the switch element SW, but not limited thereto.

In other embodiments (not shown), the conductive pattern PP1 and/or the conductive pattern PP2 may be connected to a ground potential or a direct current bias voltage, but not limited thereto.

Please refer to FIG. 8. The manufacturing method of the electronic device may include providing the substrate SUB and providing the adjustable element 10, wherein the adjustable element 10 includes the liquid crystal layer LC. In addition, the manufacturing method of the electronic device may include bonding the adjustable element 10 onto the substrate SUB. For example, a bonding member BE1 and/or a bonding member BE2 may be respectively disposed on the conductive material PP5 and/or the conductive material PP6. In some embodiments, the bonding member BE1 and/or the bonding member BE2 may include a tin ball, a copper pillar, metal, or metal alloy, but not limited thereto.

In some embodiments, a conductive material PP7 may be selectively disposed on the first pad P11 of the adjustable element 10, but not limited thereto. In some embodiments, a conductive material PP8 may be selectively disposed on the first pad P12 of the adjustable element 10, but not limited thereto. In some embodiments, the conductive material PP7 and/or the conductive material PP8 may include gold or other suitable metals, but not limited thereto. In some embodiments, the first pad P11 and the first pad P12 of the adjustable element 10 may be respectively bonded onto the second pad P21 and the second pad P22, the adjustable element 10 is bonded onto the substrate SUB. For example, the first pad P11 and the first pad P12 may be respectively bonded onto the second pad P21 and the second pad P22 through solder reflow. In some embodiments, after bonding the adjustable element 10 onto the substrate SUB, the manufacture of an electronic device 1 is initially completed.

In some embodiments, the materials of the second pad P21 and the second pad P22 include metallic materials or non-metallic materials, such as copper or other suitable materials. In some embodiments, when the material of the bonding member BE1 and/or the bonding member BE2 is tin, for example, an intermetallic compound (IMC) may be easily generated between copper and tin. The intermetallic compound, for example, grows thicker with time and as heat accumulates. When the intermetallic compound is too thick, there may be a risk of deterioration of adhesion strength. In addition, the brittleness of the intermetallic compound may easily affect electrical conduction. Therefore, in some embodiments, the conductive material PP6 (such as a nickel-gold layer) may be disposed between the second pad P22 and the bonding member BE2, or the conductive material PP5 (such as a nickel-gold layer) may be disposed between the second pad P21 and the bonding member BE1, which can improve the issue of the intermetallic compound, reduce copper oxidation, or improve reliability, but not limited thereto.

In some embodiments, the first pad P12 of the adjustable element 10 may be electrically connected to the second pad P22 through the conductive material PP8, the bonding member BE2, the conductive material PP6, and the second pad P22, but not limited thereto. In some embodiments, the second pad P22 may be electrically connected to the switch element SW through the conductive pattern PP4, but not limited thereto. Similarly, the first pad P11 of the adjustable element 10 may be electrically connected through the conductive material PP7, the bonding member BE1, the conductive material PP5, and the second pad P21, and the first pad P11 may be electrically connected to an external signal (not shown) through the conductive pattern PP3, but not limited thereto. In other embodiments, any of the above layers may be removed from or other layers may be inserted between the first pad and the second pad according to requirements. In some embodiments, the first pad P12 of the adjustable element 10 may receive a third potential through the switch element SW, the first pad P11 of the adjustable element 10 may receive a fourth potential, and there is a potential difference between the third potential and the fourth potential. The dielectric change of the liquid crystal layer LC in the adjustable element 10 may be adjusted through the potential difference, the adjustable element 10 may be used as a variable capacitor or other suitable electronic elements, but not limited thereto. In some embodiments, the third potential may be a positive potential, and the magnitude of the positive potential may be adjusted according to requirements. In some embodiments, the fourth potential may be a ground potential or a negative potential, but not limited thereto.

In some embodiments, the electronic device 1 may selectively include a protective layer PT1. The protective layer PT1 may encapsulate the adjustable element 10. In some embodiments, the material of the protective layer PT1 may include silicon nitride, silicon oxide, silicon oxynitride, epoxy resin, acrylic, solder resist, silicon material, bismaleimide, polyimide, other suitable materials, or a combination of the above, but not limited thereto.

In other embodiments, the adjustable element 10 in the electronic device 1 may be replaced with other adjustable elements of the disclosure. In some embodiments, at least one or more adjustable elements 10 may be disposed on the substrate SUB according to requirements, and the structures of different adjustable elements 10 may be the same as or different from each other. In other embodiments, the configuration position of the switch element SW or the connection relationship between the switch element SW and the adjustable element 10 may be changed according to requirements and is not limited to as shown in FIG. 8. In other embodiments (not shown), the switch element SW may be disposed between the conductive layer CL3 and the conductive layer CL4. In other embodiments (not shown), the switch element SW and the adjustable element 10 may be respectively disposed on opposite surfaces of the substrate SUB, and the switch element SW may be electrically connected to the conductive pattern PP4 through a circuit (such as a via) that is not shown. The following embodiments may all be changed in the same way, which will not be repeated below.

Figure 9:
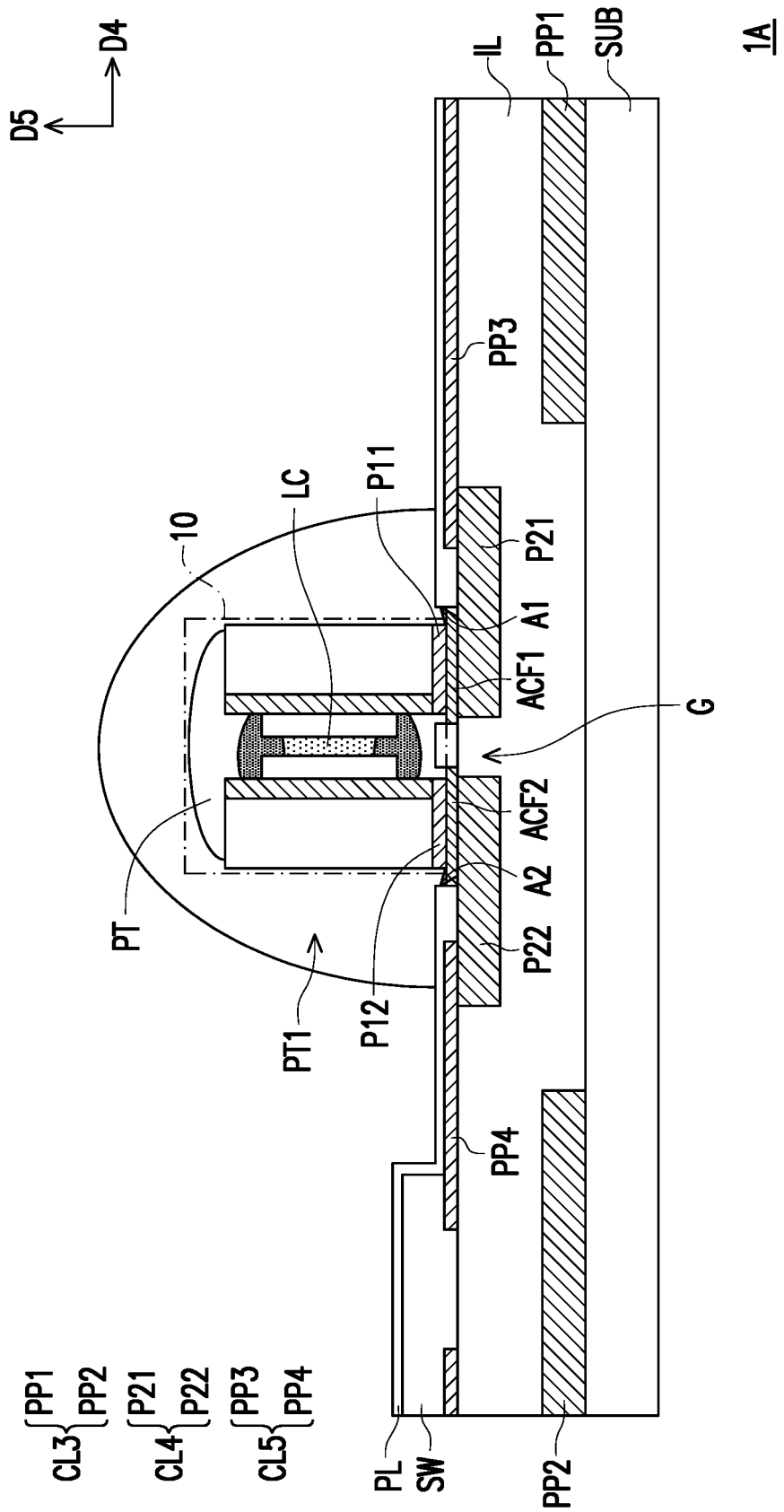
FIG. 9 is a partial cross-sectional schematic view of an electronic device according to another embodiment of the disclosure.

FIG. 9 is a partial cross-sectional schematic view of an electronic device according to another embodiment of the disclosure. Please refer to FIG. 9. The main differences between an electronic device 1A and the electronic device 1 of FIG. 8 may include the following. In the electronic device 1A, the first pad P11 and the first pad P12 of the adjustable element 10 may be respectively bonded to the second pad P21 and the second pad P22 through anisotropic conductive film ACF1 and/or anisotropic conductive film ACF2, but not limited thereto. The anisotropic conductive film ACF1 and/or the anisotropic conductive film ACF2 may be replaced with other conductive materials according to requirements. In other embodiments, although not shown, the anisotropic conductive film (such as the anisotropic conductive film ACF1 or the anisotropic conductive film ACF2) in the electronic device 1A may be selectively replaced with other conductive elements, such as conductive films, copper pillars, copper paste, silver paste (such as nano silver paste), but not limited thereto.

In other embodiments (not shown), the opening A1 and the opening A2 of the dielectric layer PL may be not separated from each other, that is, there is no other portion of the dielectric layer PL between the opening A1 and the opening A2. The opening A1 and the opening A2 may be connected to form a common opening. The first pad P11 and the first pad P12 may be electrically connected to the second pad P21 and the second pad P22 via the anisotropic conductive film (or other replaceable conductive elements as above) disposed in the common opening. It should be noted that the first pad P11 and the first pad P12 are not electrically connected to each other, and the second pad P21 and the second pad P22 are not electrically connected to each other.

In some embodiments, the electronic device 1A may selectively not include the bonding member BE1, the bonding member BE2, the conductive material PP5, the conductive material PP6, the conductive material PP7, and/or the conductive material PP8 of FIG. 8, but not limited thereto.

Figure 10:
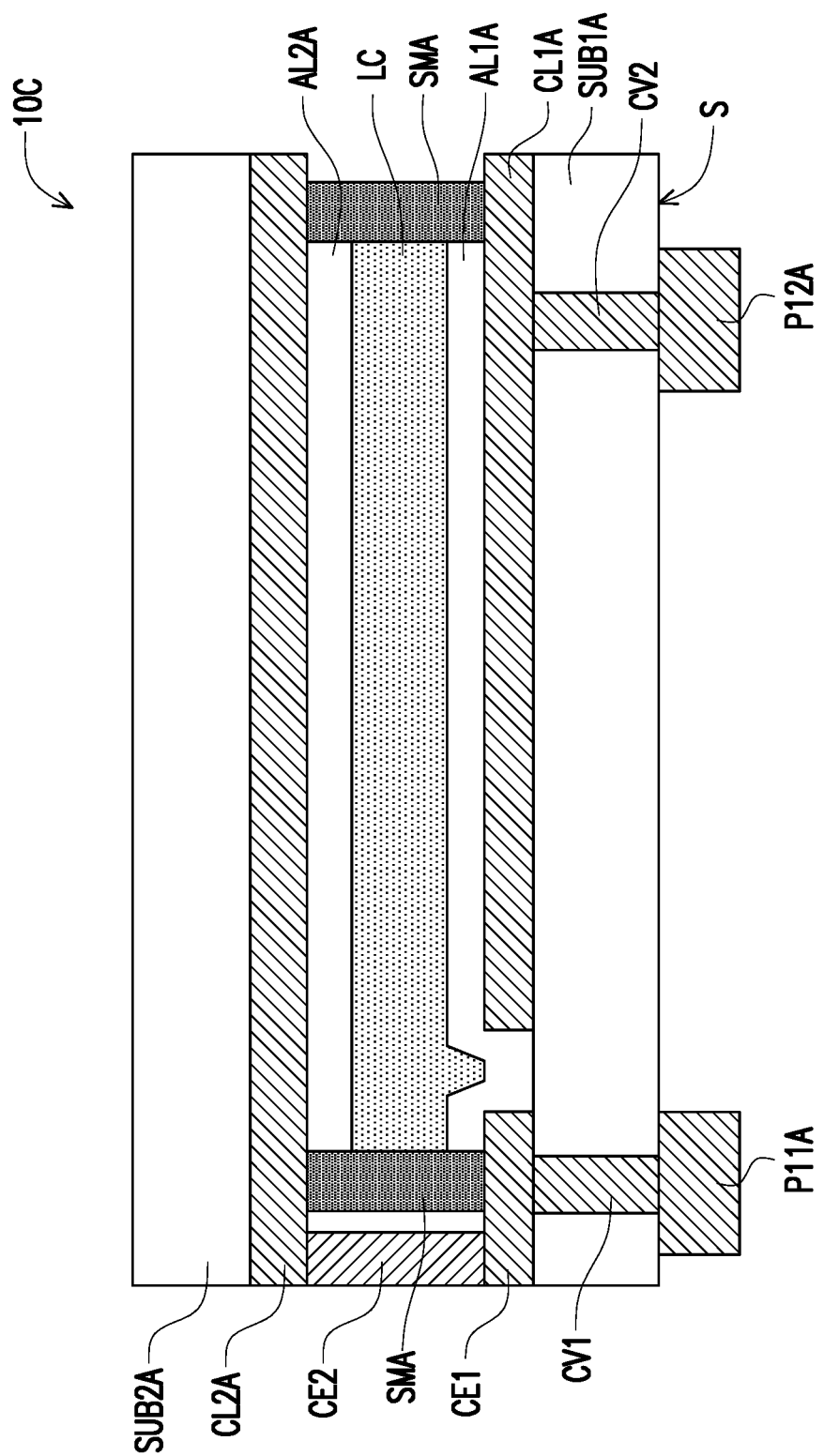
FIG. 10 is a partial cross-sectional schematic view of an adjustable element according to another embodiment of the disclosure.

FIG. 10 is a partial cross-sectional schematic view of an adjustable element according to another embodiment of the disclosure. Please refer to FIG. 10. A manufacturing method of an adjustable element 10C may include providing a first substrate SUB1A. The material of the first substrate SUB1A may be the same as the material of the first substrate SUB1, so the description will not be repeated. In some embodiments, the manufacturing method of the adjustable element may include disposing a first conductive layer CL1A and/or a first alignment layer AL1A on the first substrate SUB1A. The first conductive layer CL1 may be disposed on the first substrate SUB1A and located between the first substrate SUB1A and the first alignment layer AL1A. In other embodiments (not shown), a dielectric layer may be selectively added between the first conductive layer CL1A and the first substrate SUB1A. The dielectric layer may reduce the chance of peeling between the first substrate SUB1A and the first conductive layer CL1A. In some embodiments, the first conductive layer CL1A may include a transparent conductive layer, a non-transparent conductive layer, or a combination of the above. The material of the first conductive layer CL1A may be the same as the material of the first conductive layer CL1, so the description will not be repeated. In some embodiments, a first conductive element CE1 may be disposed on the first substrate SUB1A. The first conductive element CE1 may be adjacent to the first conductive layer CL1A, but the first conductive element CE1 and the first conductive layer CL1A may be electrically insulated from each other. In some embodiments, the first conductive element CE1 and the first conductive layer CL1A may be formed of the same layer or different conductive layers. In some embodiments, the first alignment layer AL1A may be extend to a portion of the first conductive element CE1 and fill the gap between the first conductive element CE1 and the first conductive layer CL1A, but not limited thereto. In other embodiments (not shown), the first alignment layer AL1A may be not extend to a portion of the first conductive element CE1. In some embodiments, the manufacturing method of the adjustable element 10C may further include providing a second substrate SUB2A. The material of the second substrate SUB2 may be the same as or different from the material of the first substrate SUB1A, so the description will not be repeated. In some embodiments, the manufacturing method of the adjustable element 10C may further include disposing a second conductive layer CL2A and a second alignment layer AL2A on the second substrate SUB2A. The second conductive layer CL2A may be disposed on the second substrate SUB2A and located between the second substrate SUB2A and the second alignment layer AL2A. In other embodiments (not shown), a dielectric layer may be selectively disposed between the second conductive layer CL2A and the second substrate SUB2A. The dielectric layer may reduce the chance of peeling between the second substrate SUB2A and the second conductive layer CL2A. The second conductive layer CL2A may be a transparent conductive layer or a non-transparent conductive layer. The material of the second conductive layer CL2A may be the same as the material of first conductive layer CL1A, so the description will not be repeated. In some embodiments, the manufacturing method of the adjustable element 10C may include providing the liquid crystal layer LC, and the material thereof may be referred to the above, so the description will not be repeated.

In some embodiments, the manufacturing method of the adjustable element 10C may include providing a sealing member SMA. The liquid crystal layer LC is sealed between the first substrate SUB1A and the second substrate SUB2A through the sealing member SMA. In some embodiments, the sealing member SMA may selectively contact a portion of the first conductive element CE1, but not limited thereto. In some embodiments, the liquid crystal layer LC may be disposed between the first alignment layer AL1A, the second alignment layer AL2A and the sealing member SMA. In some embodiments, the first alignment layer AL1A may be disposed between the liquid crystal layer LC and the first conductive layer CL1A, and the second alignment layer AL2A may be disposed between the liquid crystal layer LC and the second conductive layer CL2A. In some embodiments, viewed from a normal direction of the first substrate SUB1A, areas of the first conductive layer CL1A and the second conductive layer CL2A may be different. In some embodiments, viewed from the normal direction of the first substrate SUB1A, areas of the first alignment layer AL1A and the second alignment layer AL2A may be the same or different.

In some embodiments, the manufacturing method of the adjustable element 10C may include forming a via CV1 and a via CV2 on the second substrate SUB2A, but not limited thereto. In some embodiments, the sizes or shapes of the via CV1 and the via CV2 may be the same or different. In some embodiments, the via CV1 and the via CV2 may be formed by forming a through hole (not labeled) in the first substrate SUB1A, and filling a conductive material into the through hole, but not limited thereto. The conductive material is not limited to a single or composite material. In some embodiments, the manufacturing method of the adjustable element 10C may include disposing a second conductive element CE2 between the first substrate SUB1A and the second substrate SUB2A. The second conductive element CE2 may be adjacent to the sealing member SMA. In some embodiments, the second conductive element CE2 may selectively contact or not contact the sealing member SMA. In some embodiments, the manufacturing method of the adjustable element 10C may include disposing a first pad P11A and/or a first pad P12A on a surface S of the first substrate SUB1A away from the first conductive layer CL1A. The material of the first pad P11A and/or the first pad P12A may be the same as or different from the material of the first pad P11 and/or the first pad P12, so the description will not be repeated. In some embodiments, the second conductive layer CL2A may be electrically connected to the first conductive element CE1 via the second conductive element CE2, and the first conductive element CE1 may be electrically connected to the first pad P11A via the via CV1, but not limited thereto. In some embodiments, the material of the second conductive element CE2 includes a tin ball, a copper pillar, metal, or metal alloy. In some embodiments, a second conductive element CE2 may include a single-layer or composite-layer material. In some embodiments, the thickness of the second conductive element CE2 may be close to the thickness of the sealing member SMA, but not limited thereto.

In some embodiments (not shown), the first pad P12A of the adjustable element 10C may be electrically connected to the second pad P22 in FIG. 7, and the first pad P12A of the adjustable element 10C may be electrically connected to the second pad P22, so as to bond the adjustable element 10C onto the substrate SUB of FIG. 7, but not limited thereto. Regarding the bonding manner of the first pad (such as the first pad P12A or the first pad P12) of FIG. 10 and the second pad P22 (as shown in FIG. 7), reference may be made to the bonding manner of FIG. 8 or FIG. 9, so the description will not be repeated.

In summary, in the embodiments of the disclosure, the adjustable element with better quality can be provided through using a liquid crystal adjustable element or other adjustable elements with adjustable dielectric constant. The adjustable element may be used as a variable capacitor. In the embodiments of the disclosure, the bonding manner of the first pad of the adjustable element and the second pad on the substrate includes surface mount technology (SMT) or other suitable bonding techniques, such as soldering (lead/tin welding) process, anisotropic conductive adhesive bonding, silver glue bonding, fusion bonding, metal thermal compression bonding, special eutectic bonding, and polymer adhesive bonding, but not limited thereto. It should be noted that "the first pad of the adjustable element being bonded to the second pad on the substrate" of the disclosure means that the first pad is electrically connected to the second pad, and the electrical connection manner of the first pad and the second pad may be, for example, direct connection or electrical connection through other conductive materials.

The above embodiments are only used to illustrate, but not to limit, the technical solutions of the disclosure. Although the disclosure has been described in detail with reference to the above embodiments, persons skilled in the art should understand that they may still combine or modify the technical solutions described in the above embodiments or equivalently replace some or all of the technical features. However, the combinations, modifications, or replacements do not cause the essence of the corresponding technical solution to deviate from the scope of the technical solutions of the embodiments of the disclosure.

Although the embodiments of the disclosure and the advantages thereof have been disclosed as above, it should be understood that persons skilled in the art may make changes, substitutions, and modifications without departing from the spirit and scope of the disclosure, and the features between the embodiments may be arbitrarily mixed and replaced to form other new embodiments. In addition, the protection scope of the disclosure is not limited to the processes, machines, manufacture, material composition, devices, methods, and steps in the specific embodiments described in the specification. Persons skilled in the art may understand from the content of the disclosure that the current or future-developed processes, machines, manufacture, material composition, devices, methods, and steps may all be used according to the disclosure as long as they may implement substantially the same functions or obtain substantially the same results in the embodiments described herein. Therefore, the protection scope of the disclosure includes the processes, machines, manufacture, material composition, devices, methods, and steps. In addition, each claim constitutes an individual embodiment, and the protection scope of the disclosure also includes the combination of each claim and embodiment. The protection scope of the disclosure shall be defined by the appended claims.

What is claimed is:

1. An electronic device, comprising:
    a substrate;
    a first pad;
    a second pad,
    wherein the first pad and the second pad are disposed on the substrate; and
    an adjustable element, bonded onto the substrate and comprising:
        a liquid crystal layer;
        a third pad; and
        a fourth pad,
    wherein the adjustable element is bonded to the substrate through the third pad and the fourth pad, and the third pad and the fourth pad are separated from each other.

2. The electronic device according to claim 1, wherein the adjustable element further comprises:
    a first substrate; and
    a second substrate, wherein the liquid crystal layer is disposed between the first substrate and the second substrate.

3. The electronic device according to claim 2, wherein the third pad and the fourth pad are respectively disposed on a sidewalls of the first substrate and the second substrate.

4. The electronic device according to claim 3, wherein the first pad is bonded onto the third pad, and the second pad is bonded onto the fourth pad.

5. The electronic device according to claim 3, wherein the adjustable element further comprises:
    a first conductive layer, disposed between the first substrate and the liquid crystal layer;
    a first alignment layer, disposed between the first conductive layer and the liquid crystal layer;
    a second conductive layer, disposed between the second substrate and the liquid crystal layer; and
    a second alignment layer, disposed between the second conductive layer and the liquid crystal layer.

6. The electronic device according to claim 5, wherein the adjustable element further comprises:
    a sealing member, wherein the liquid crystal layer is disposed between the first alignment layer, the second alignment layer, and the sealing member.

7. The electronic device according to claim 3, wherein the adjustable element further comprises:
   a protective layer, disposed on another sidewall of the at least one of the first substrate and the second substrate.

8. The electronic device according to claim 2, wherein the adjustable element further comprises:
   an insulating layer, disposed on a side of the first substrate away from the second substrate; and
   another insulating layer, disposed on a side of the second substrate away from the first substrate.

9. The electronic device according to claim 1, wherein the liquid crystal layer has a thickness of 1 μm to 20 μm.

10. The electronic device according to claim 1, wherein the adjustable element is used as a variable capacitor.

* * * * *